United States Patent [19]

Shiotani et al.

[11] Patent Number: 5,063,802
[45] Date of Patent: Nov. 12, 1991

[54] VARIABLE CUTTING-ANGLE CIRCULAR SAW DEVICE

[75] Inventors: Takeshi Shiotani; Kouichi Miyamoto, both of Tokyo, Japan

[73] Assignee: Ryobi Ltd., Hiroshima, Japan

[21] Appl. No.: 604,852

[22] Filed: Oct. 29, 1990

[30] Foreign Application Priority Data

Nov. 16, 1989 [JP] Japan .............................. 1-133199[U]

[51] Int. Cl.⁵ ................................................ B27B 5/00
[52] U.S. Cl. ...................................... 83/98; 83/471.3; 83/490; 144/252 R
[58] Field of Search ................ 83/98, 100, 165, 471.3, 83/478, 490; 144/252 R; 51/273

[56] References Cited

U.S. PATENT DOCUMENTS

| | | | |
|---|---|---|---|
| 1,552,553 | 9/1925 | Georgia | 144/252 R |
| 1,830,151 | 11/1931 | Wilderson | 144/252 R |
| 2,399,239 | 4/1946 | Martin | 144/252 R |
| 3,322,169 | 5/1967 | Hilliard | 83/165 X |
| 3,882,598 | 5/1975 | Earle et al. | 51/273 X |
| 4,253,362 | 3/1981 | Olson | 83/100 |
| 4,326,864 | 4/1982 | Sittler | 83/98 X |
| 4,932,449 | 6/1990 | Omoto | 144/252 R |
| 4,934,233 | 6/1990 | Brundage et al. | 83/397 |

Primary Examiner—Mark Rosenbaum
Assistant Examiner—Eugenia A. Jones
Attorney, Agent, or Firm—Sughrue, Mion, Zinn, Macpeak & Seas

[57] ABSTRACT

A variable cutting-angle circular saw device includes a base; a rotary table 2 rotatably disposed in the central portion of the base; a bracket liftably attached to a hinge; a motor, a speed reducer, a circular saw, an outer cover, and a safety cover, all being fixed to the bracket; a fence fixed in a rearward position of the base; a clamp fixed at left- and right-hand positions of the device so as to allow a workpiece to be clamped for cutting the workpiece. A sawdust-guiding frame piece is suspended from a lower end of a rear portion of the cover so as to smoothly block a gap between the lower end of the rear portion of the outer cover and an upper surface of a curved portion in the central portion of the fence, guiding the sawdust blowing up via the blow-up port, to the inner side of the rear end of the outer cover. A sawdust accommodating chamber below the rotary table is closed at the bottom and has a substantially arcuate bag-like shape, and communication with the cover via a port at the rear thereof.

2 Claims, 3 Drawing Sheets

VARIABLE CUTTING-ANGLE CIRCULAR SAW DEVICE

BACKGROUND OF THE INVENTION

1. Field of the Invention

The present invention relates to a variable cutting-angle circular saw device which is generally referred to as a miter saw or a compound miter saw.

2. Description of the Related Art

FIG. 5 shows a left-hand side elevational view of a conventional variable cutting-angle circular saw device.

This variable cutting-angle circular saw device is arranged as follows: A rotary table 2 is rotatably disposed in the central portion of a base 1, a hinge 3 is disposed in the rear of the rotary table 2, and a bracket 4 is attached to the hinge 3 in such a manner as to be capable of being lifted and lowered. Fixed to the bracket 4 are a motor 5, a speed reducer 6, a circular saw 7, an outer cover 8, and a safety cover 9. In addition, a fence 10 is fixed in a rearward position of the base 1, and a clamp means 11 is fixed at left- and right-hand positions thereof so as to allow a material (hereinafter referred to as the workpiece) w to be cut, such as timber, to be clamped. The circular saw 7 is lowered until it enters a slit 12 provided in the rotary table 2 so as to cut the workpiece w.

The compound miter saw is arranged such that the rotary table 2 is rotatable to make the miter angle and bevel angle of the circular saw 7 variable, and the hinge 3 is rotatable about a pin shaft 13 within a vertical plane along a transverse direction of the device.

Accordingly, with the compound miter saw, since the circular saw 7 can be inclined with two degrees of freedom, the workpiece w can be cut at virtually any diagonal angle.

With the miter saw, the rotary table 2 is rotatable so as to make the miter angle of the circular saw 7 variable, but the hinge 3 is not rotatable. Accordingly, since the circular saw 7 can be inclined with one degree of freedom, the workpiece w can be cut at an appropriate miter angle with respect to the transverse direction of the device as viewed from its top.

When the circular saw 7 is lowered and the cutting of the workpiece w is commenced, until the circular saw 7 enters the slit 12, the sawdust produced by cutting is blown up in such a manner as to pass by the inner side of the rear end of the outer cover 8 by means of the air flow produced by the rotation of the circular saw 7. The sawdust then passes through a sawdust blow-out port 15 provided in an upper rear end of the outer cover 8, and is discharged to the outside from a sawdust blow-out tube (not shown) provided in such a manner as to pass through an upper portion of the bracket 4. Accordingly, if the sawdust blow-out tube is provided with an air-permeable dust collecting bag, it is possible to collect the sawdust without being scattered. From the time the circular saw 7 is further lowered and begins to enter the slit 12 and until cutting is completed with the circular saw 7 lowered to a position 7', the sawdust passes through the slit 12 and is accommodated in a sawdust accommodating space 14.

Accordingly, the collection of the sawdust accommodated in the sawdust accommodating space 14 becomes an issue.

FIG. 6 illustrates a cross-sectional view taken along the line VI—VI in FIG. 5. The sawdust accommodating space 14 has its four sides surrounded by rib-like vertical walls 2a, 2b elongated in the transverse direction, a front-side inclined wall 2c, and an intermediate inclined wall 2d. An extreme end of the sawdust accommodating space 14 at the rear end of the slit 12 is made open, thereby constituting a sawdust blow-up port 14a.

Returning now to FIG. 5 to resume the description, the fence 10 is arranged such that its central portion corresponding to the circular saw 7 is formed as a curved portion 10a for avoiding interference with the circular saw 7 by detouring the rear side of the sawdust blow-up port 14a, and the wall surface of the curved portion 10a is formed as a conical wall surface 101 disposed in proximity to an edge of the sawdust blow-up port 14a.

Accordingly, when the circular saw 7 is lowered in such a manner as to enter the slit 12, the sawdust accommodated in the sawdust accommodating space 14 is blown up by the air flow caused by the rotation of the circular saw 7, in such a manner as to pass the sawdust blow-up port 14a and pass by the inner side of the rear end of the outer cover 8. Then the sawdust passes through the sawdust discharging blow-out port 15 provided in the upper rear end of the outer cover 8, and is discharged to the outside through the sawdust blow-out tube provided in the bracket 4.

In accordance with the above-described conventional variable cutting-angle circular saw device, since the gap between the lower end of the rear portion of the outer cover 8 and the upper portion of the curved portion 10a in the central portion of the fence 10 is wide open, it does not necessarily follow that the entire volume of the sawdust blown up through the sawdust blow-up port 14a will pass through the gap between the lower end of the rear portion of the outer cover 8 and the upper surface of the curved portion 10a in the central portion of the fence 10. Instead, some of the sawdust will be scattered rearwardly of the device. In addition, during the initial period of cutting when the cutting of the workpiece w is commenced after lowering the circular saw 7, the sawdust is scattered low and rearwardly of the upper surface of the workpiece w. In this case as well, the sawdust passes through the gap between the lower end of the rear portion of the outer cover 8 and the upper surface of the curved portion 10a in the central portion of the fence 10, so that cleaning is troublesome.

Meanwhile, the sawdust accommodating space 14 has its lower portion open owing to the pattern drawing involved in die casting, and communicates with an opening 1a of the base 1. As a result, the dust accommodated in the sawdust accommodating space 14 is discharged to the outside through the gap in the lower surface of the base 1, so that cleaning is troublesome.

SUMMARY OF THE INVENTION

Accordingly, an object of the present invention is to provide a variable cutting-angle circular saw device as a compound miter saw or a miter saw which is capable of preventing the sawdust from scattering rearwardly of the device through a gap between the lower end of a rear portion of an outer cover and an upper surface of a curved portion in a central portion of a fence, and capable of allowing the total volume of sawdust accommodated in a sawdust accommodating space to be blown out from a sawdust blow-out port at a rear end of a slit, thereby substantially enhancing the sawdust recovering efficiency, thereby overcoming the above-described drawbacks of the conventional art.

Another object of the present invention is to provide a variable cutting-angle circular saw device as a compound miter saw or a miter saw which is capable of preventing the discharge of the sawdust to the surroundings of the device from a lower portion of a base so that a large volume of sawdust will not scatter to the surroundings of the device, thereby facilitating the cleaning.

To these ends, in accordance with the present invention, there is provided a variable cutting-angle circular saw device wherein a rotary table 2 is provided rotatably on a base 1, a circular saw 7 rotated by driving means is supported on the rotary table 2 in such a manner as to be capable of being lifted and lowered, an outer cover 8 for covering an upper portion of the circular saw 7 is provided, a fence for receiving a rear surface of a material to be cut, such as timber, is provided at a required position adjacent to a rear end on the base 1, a linear slit 12 allowing the circular saw 7 to pass therethrough is provided in the rotary table 2 so as to allow a lower end of the circular saw 7 to be lowered from an upper surface of the rotary table 2, a longitudinally elongated sawdust accommodating space 14 for accommodating the sawdust is formed on the lower side of the slit 12 provided in the rotary table 2, a sawdust blow-up port 14a communicating with the sawdust accommodating space 14 is provided at a rear end of the slit 12 in an upper surface of the rotary table 2, a central portion of the fence 10 is formed as a curved portion 10a for avoiding interference with the circular saw 7 by detouring a rear side of the sawdust blow-up port 14a, a wall surface of the curved portion 10a is formed as a conical wall surface 101 disposed in proximity to an edge of the sawdust blow-up port 14a, wherein when the circular saw 7 is lowered and begins to enter the slit 12, the sawdust in the sawdust accommodating space 14 is blown up by an air flow produced by the rotation of the circular saw 7, in such a manner as to pass by an inner side of a rear end of the outer cover 8 via the sawdust blow-up port 14a, and is discharged to an outside from a necessary exit port, the variable cutting-angle circular saw device being characterized in that a bottom of the sawdust accommodating space 14 is closed by a cover 16, the sawdust accommodating space 14, as viewed from a side of the device, being formed into a substantially arcuate bag-like shape, and that a sawdust-guiding frame piece 17 is provided in such a manner as to be suspended from a lower end of a rear portion of the cover 8 such that, when the circular saw 7 is lowered to a maximum level, a gap between the lower end of the rear portion of the outer cover 8 and an upper surface of the curved portion 10a in the central portion of the fence 10 is blocked substantially smoothly, thereby guiding the sawdust blowing up via the blow-up port 14a, to the inner side of the rear end of the outer cover 8.

In operation, when the circular saw 7 is lowered and the cutting of the workpiece w is commenced, during the initial period of cutting, sawdust is scattered low and rearwardly of the upper surface of the workpiece w. However, the sawdust then collides against the sawdust-guiding frame piece 17, and part of the sawdust is blown up in such a manner as to pass by the inner side of the rear end of the outer cover 8, by means of the air flow caused by the rotation of the circular saw 7, and is then discharged to the outside through the necessary exit port. The remaining portion of the sawdust falls down and is collected through the guiding action of the conical wall surface 101 of the curved portion 10a in the central portion of the fence 10, then passes through the sawdust blow-up port 14a and is accommodated in the sawdust accommodating space 14.

When the cutting by the circular saw 7 reaches the bottom side of the workpiece w and the circular saw 7 substantially enters the slit 12, the circular saw 7 scrapes up the sawdust accommodated in the sawdust accommodating space 14, the sawdust is blown up through the sawdust blow-up port 14a by means of the air flow produced by the rotation of the circular saw 7. At this time, the sawdust-guiding frame piece 17 is lowered to the vicinity of the upper surface of the curved portion 10a in the central portion of the fence 10 so as to block the gap. Hence, the sawdust blown up through the sawdust blow-up port 14a is blown up in such a manner as to pass by the inner side of the rear end of the outer cover 8 along the conical wall surface 101 and the sawdust-guiding frame piece 17 before it is discharged to the outside through the necessary exit port.

Thus, the sawdust is collected without scattering rearwardly over the curved portion 10a, and the sawdust in the sawdust accommodating space 14 is collected without being filled.

DESCRIPTION OF THE PREFERRED EMBODIMENTS

Figure 1:
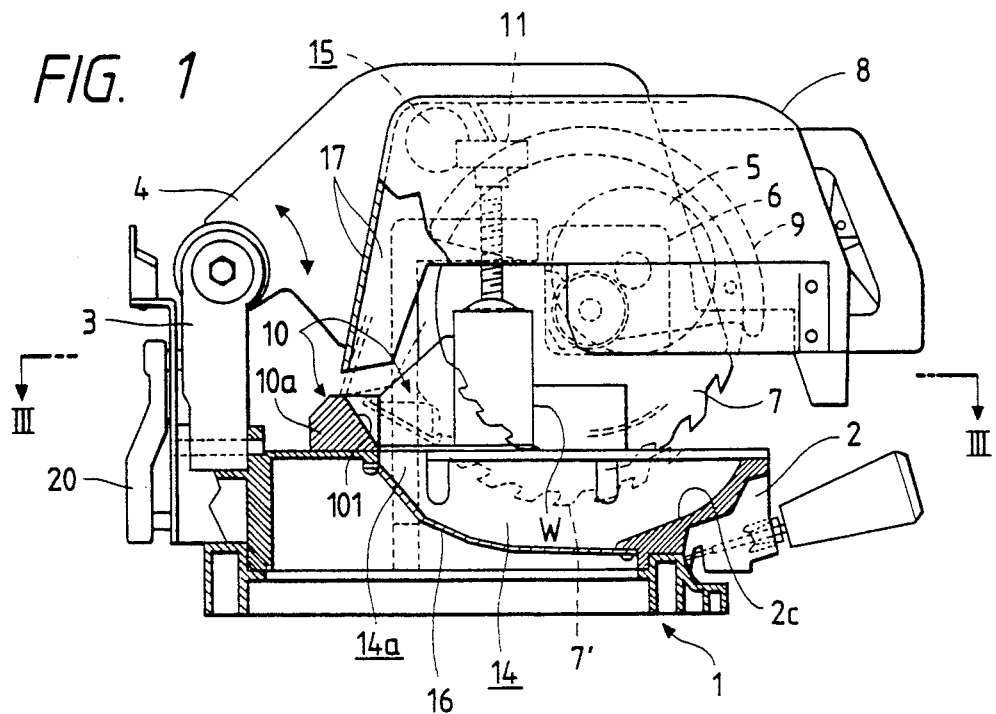
FIG. 1 is a left-hand side elevational view, partly in section, of a first embodiment in which a variable cutting-angle circular saw device in accordance with the present invention is applied to a compound miter saw.
Figure 2:
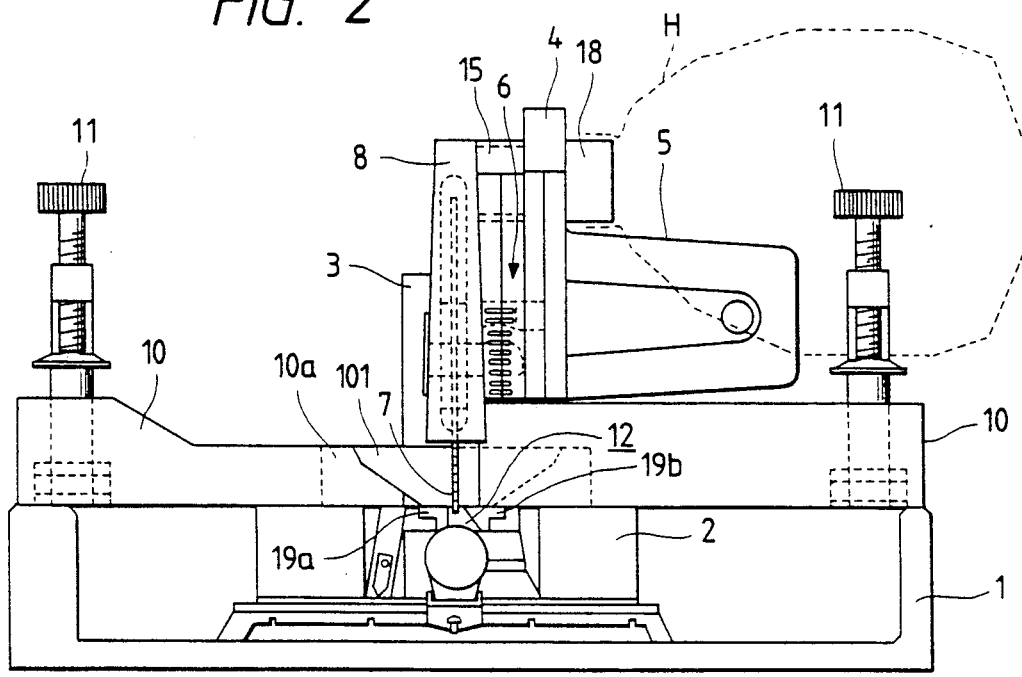
FIG. 2 is a front elevational view of the same.

FIGS. 1 to 4 illustrate an embodiment in which a variable cutting-angle circular saw device in accordance with the present invention is applied to a compound miter saw.

This compound miter saw is arranged as follows: A rotary table 2 is rotatably disposed on a substantially central portion of a base 1 on which a workpiece w, such as timber, can be laid. A bracket 4 is attached to a hinge 3 which is disposed from the rear of the rotary table 2 and is bolted by a tightening lever 20 so as to be stopped at a transversely arbitrary, inclined position. An outer cover 8, a safety cover 9 and power means constituted by a motor 5 and a speed reducer 6, are fixed to the bracket 4 in such a manner as to be located above the rotary table 2. A circular saw 7 rotated by the power means is rotatably supported to the bracket 4 so that the circular saw 7 can be located above the rotary table 2. The outer cover 8 covers an upper portion of the circular saw 7. The safety cover 9 is adapted to rotate upwardly of a front end of the outer cover 8 through the action of a link with the lowering of the circular saw 7 and enter the inside of the outer cover 8 so as to expose a lower portion of the circular saw 7 and ensure cutting by the circular saw 7. After the circular saw 7 is positioned to an appropriate posture, if the saw is rotatively driven and lowered, then the workpiece w, such as timber, fixed by a clamp means 11 can be cut.

A fence 10 extending transversely is located in the vicinity of a rear end of an upper surface of the base 1 and is arranged to receive a rear side surface of the workpiece w. The clamp means 11 is provided in such a manner as to fix the upper surface of the workpiece w.

A linear slit 12 for allowing the circular saw 7 to pass therethrough is provided in the rotary table 2 so as to permit the lower end of the circular saw 7 to be lowered to a position 7' lower than the upper surface of the rotary table 2. A transversely elongated sawdust accommodating space 14 for accommodating sawdust is formed on the lower side of the slit 12 of the rotary table 2.

A sawdust blow-up port 14a communicating with the sawdust accommodating space 14 is provided in the rear end of the slit 12 in the upper surface of the rotary table 2. The central portion of the fence 10 serves as a curved portion 10a for avoiding interference with the circular saw 7 by detouring the rearside of the sawdust blow-up port 14a. The wall surface of the curved portion 10a is formed as a conical wall surface 101 located in proximity to an edge of the sawdust blow-up port 14a.

Figure 3:
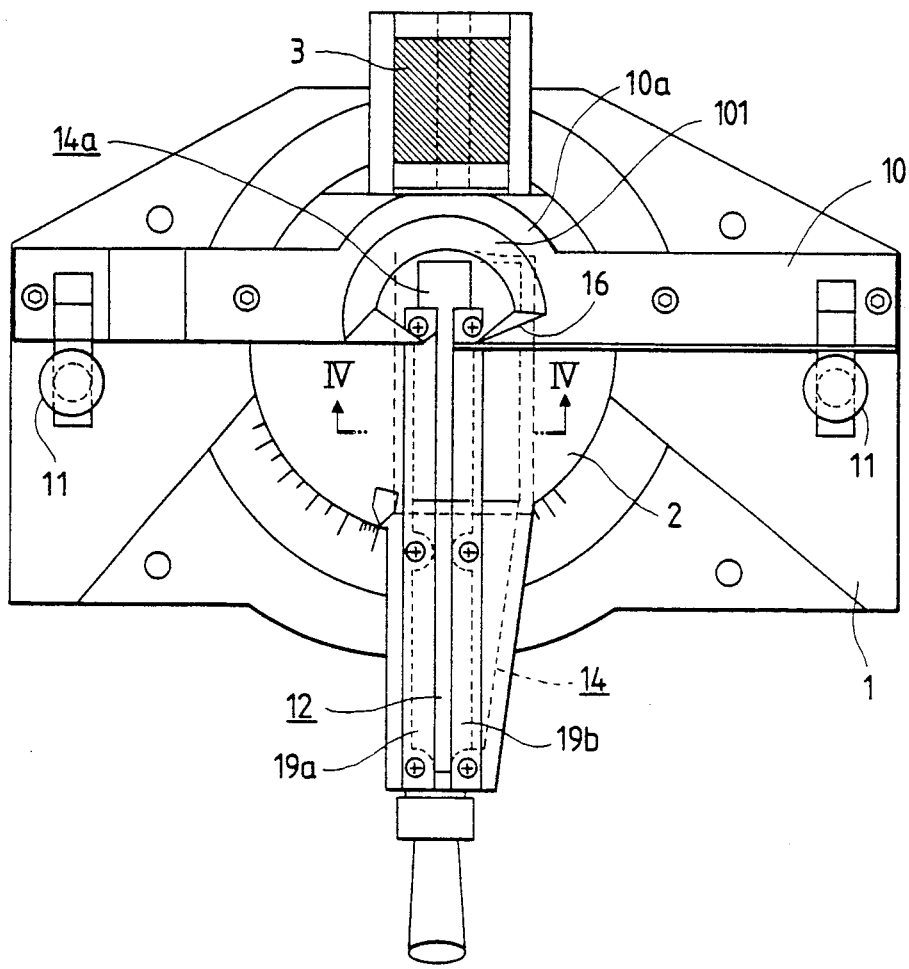
FIG. 3 is a horizontal cross-sectional view taken along the line III—III in FIG. 1.
Figure 4:
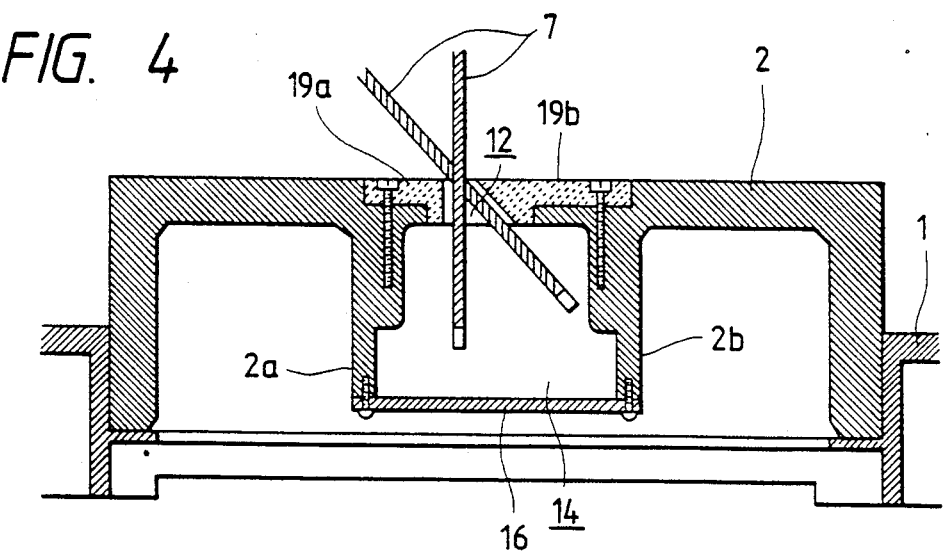
FIG. 4 is a cross-sectional view taken along the line IV—IV in FIG. 3.
Figure 5:
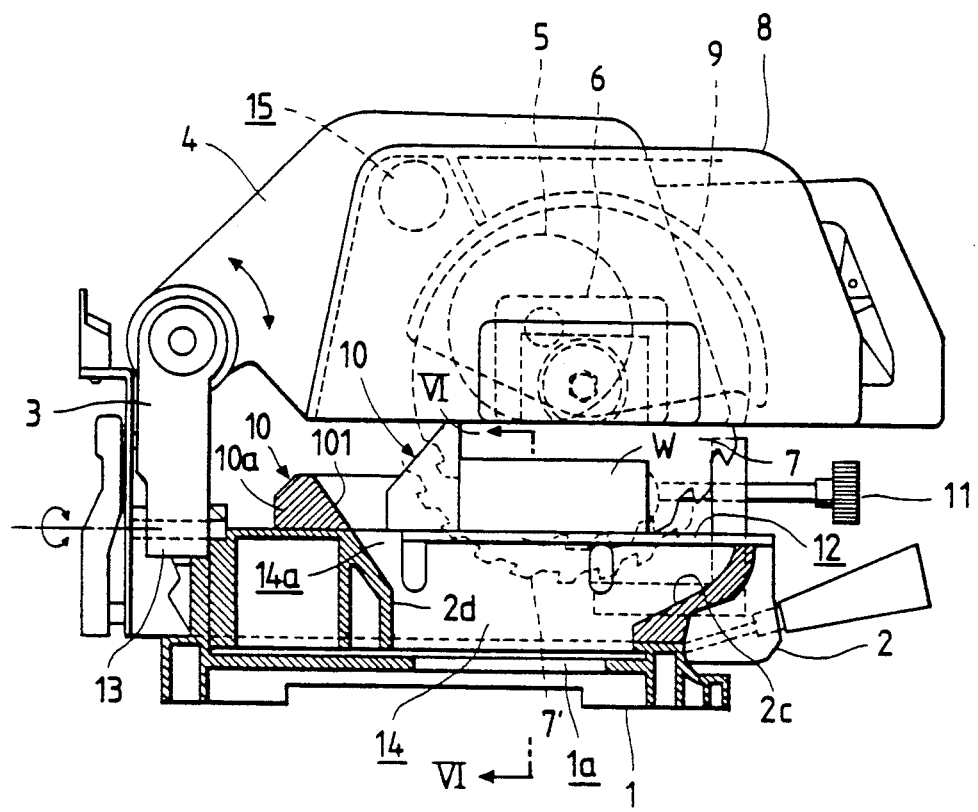
FIG. 5 is a left-hand side elevational view, partly in section, of a conventional example of a variable cutting-angle circular saw device (compound miter saw)
Figure 6:
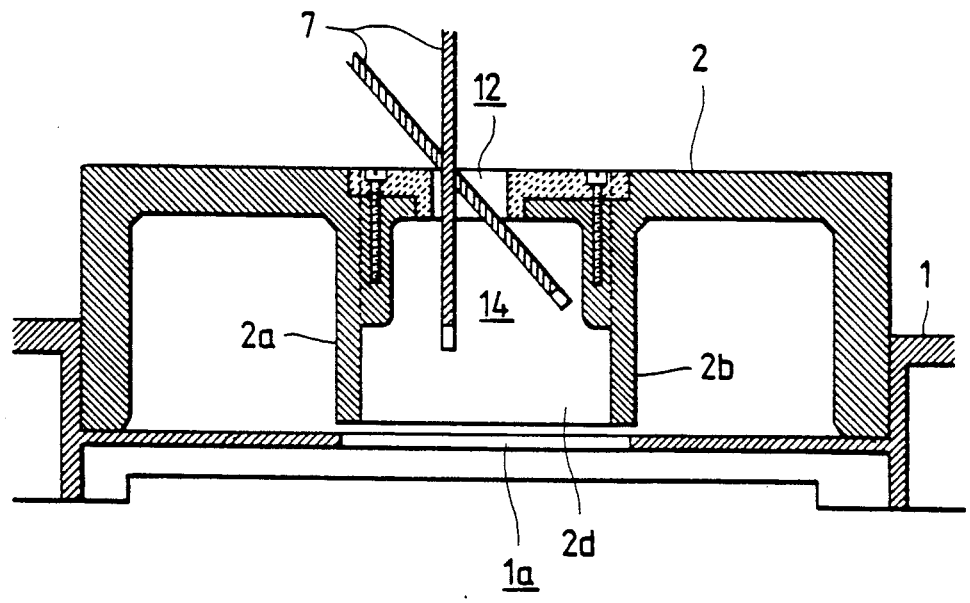
FIG. 6 is a cross-sectional view taken along the line V—V in FIG. 5.

FIG. 4 shows a cross-sectional view taken along the line IV—IV in FIG. 3. The three sides of the sawdust accommodating space 14 are surrounded by rib-like vertical walls 2a, 2b located on the left- and right-hand sides of the slit 12 and formed into an arcuate configuration and by a front-side inclined wall 2C (see FIG. 3). An opening between the rib-like vertical walls 2a, 2b serves as a bag-like space enclosed by a cover 16. An extreme rear end of the slit 12 is made open, serving as the sawdust blow-up port 14a.

On the upper side of the sawdust accommodating space 14, synthetic resin-made edge plates 19a, 19b having a hardness sufficient to allow the edge plates to be cut by the circular saw 7 are bolted to the rotary table 2. The space between the edge plates 19a, 19b constitutes the slit 12. The slit 12 has its cross section formed into a required trapezoid of a required minimum configuration for allowing the circular saw 7 set vertically or inclined at a maximum bevel angle to pass therethrough.

Accordingly, the sawdust accommodated in the sawdust accommodating space 14 through the slit 12 is arranged to be blown upward through the sawdust blow-up port 14a by means of the air flow caused inside the sawdust accommodating space 14 as the circular saw 7 enters the sawdust accommodating space 14 through the slit 12. As a result, the arrangement provided is such that the sawdust scraped off and scattered by the circular saw 7 will not easily escape upwardly through the slit 12.

A sawdust-guiding frame piece 17, whose horizontal cross section is a groove type with the groove facing the front side, is suspended from a lower end of a rear portion of the outer cover 8. When the circular saw 7 is lowered to a maximum level, the sawdust-guiding frame piece 17 is adapted to block substantially smoothly the gap between the lower end of the rear portion of the outer cover 8 and the upper surface of the curved portion 10a in the central portion of the fence 10, and serves to guide the sawdust being blown up through the sawdust blow-up port 14a to the inner side of the rear end of the outer cover 8. Then, the sawdust blown up in such a manner as to pass by the inner side of the rear end of the outer cover 8 passes through a sawdust blow-out port 15 provided in the rear end of the upper portion of the outer cover, and is discharged through a sawdust blow-out tube 18 provided in the bracket 4. An air-permeable dust collecting bag H for collecting the sawdust is attached to the sawdust blow-out tube 18.

Accordingly, when the circular saw 7 is lowered and the cutting of the workpiece w is commenced, during the initial period of cutting, the sawdust is scattered low and rearwardly of the upper surface of the workpiece w, but most of it collides against the sawdust-guiding frame piece 17. As a result, part of the sawdust is blown upward in such a manner as to pass by the inner side of the rear end of the outer cover 8 by means of the air flow occurring due to the rotation of the circular saw 7, passes through the sawdust blow-out port 15, and is collected in the dust collecting bag H through the sawdust blow-out tube 18. Meanwhile, the remaining portion of the sawdust falls down, is collected through the guiding action of the conical wall surface 101 of the curved portion 10a in the central portion of the fence 10, passes through the sawdust blowup port 14a, and is accommodated in the sawdust accommodating space 14. Subsequently, as cutting progresses, the direction in which the sawdust is scattered rearwardly becomes gradually high. For this reason, the volume of the sawdust blown upward in such a manner as to pass by the inner side of the rear end of the outer cover 8 becomes gradually large by means of the air flow produced by the rotation of the circular saw 7. Hence, the volume of the sawdust accommodated in the sawdust accommodating space 14, after falling and passing through the sawdust blowup port 14a, becomes gradually small. At the point of time when the circular saw 7 is lowered immediately before entering the slit 12, substantially all the volume of it is blown upward in such a manner as to pass by the inner side of the rear end of the outer cover 8, passes through the sawdust blow-out port 15 provided in the rear end of the upper portion of the outer cover 8, and is discharged to the outside through the sawdust blow-out tube 18 provided in the bracket 18. Subsequently, when the cutting of the circular saw 7 reaches the bottom of the workpiece w and the circular saw 7 begins to enter the slit 12, the sawdust in the vicinity of the bottom of the workpiece w passes through the slit 12 and is accommodated in the sawdust accommodating space 14. The sawdust located away from the bottom of the workpiece w is blown upward in such as manner as to pass by the inner side of the rear end of the outer cover 8. Then, as the circular saw 7 is further lowered and substantially enters the slit 12, the sawdust-guiding frame piece 17 is lowered to the vicinity of the upper surface of the curved portion 10a in the central portion of the fence 10. Meanwhile, since the sawdust accommodating space 14, as viewed from the side of the device, is configured into an arcuate bag-like space, the air flow caused by the rotation of the circular saw 7 inside the sawdust accommodating space 14 is blown upward through the sawdust blow-up port 14a. Hence, the sawdust is carried upward by the air flow in such a manner as to pass by the inner side of the rear end of the outer cover 8 along the conical wall surface 101 and the sawdust-guiding frame piece 17, and passes through the sawdust blow-out port 15 and the sawdust blow-out tube 18 before it is collected in the sawdust collecting bag H.

As described above, in accordance with the variable cutting-angle circular saw device of the present invention, the following arrangement is provided: The bottom of the sawdust accommodating space provided below the slit in the upper surface portion of the rotary table is closed by the cover. The sawdust accommodating space, as viewed from the side of the device is configured into a substantially arcuate bag-like space. The sawdust-guiding frame piece is suspended from the lower end of the rear portion of the outer cover. When the circular saw has been lowered until it begins to enter the slit, the sawdust-guiding frame piece smoothly blocks the opening, ranging from the upper surface of the curved portion in the central portion of the fence to the lower end of the rear portion of the outer cover, thereby guiding the sawdust which has blown out from the sawdust blow-out port by constituting a smooth wall surface leading to the lower end of the rear portion of the outer cover.

Accordingly, the sawdust accommodated in the sawdust accommodating space can be effectively blown out from the sawdust blow-out port at the rear end of the slit by means of the air flow produced by the rotation of the circular saw. Furthermore, the sawdust which has blown out from the sawdust blow-out through the guiding action of the sawdust-guiding frame piece can be blown out from the outside from the necessary exit port via the inner side of the rear end of the outer cover. Hence, it is possible to substantially enhance the efficiency with which the sawdust is recovered.

In addition, in accordance with the variable cutting-angle circular saw device of the present invention, the sawdust which tends to be scattered from above the curved portion in the central portion of the fence by scattering low rearwardly of the device during the initial period of cutting can be received by the sawdust-guiding frame piece suspended from the lower end of the rear portion of the outer cover, thereby making it possible to prevent the sawdust from scattering rearwardly of the device. In addition, since the sawdust accommodating space is formed into a bag-like space, the sawdust is prevented from being discharged from the lower portion of the base to the surroundings of the device. Hence, the working environment can be kept clean, and the cleaning of the surroundings of the device can be facilitated.

What is claimed is:

1. In a variable cutting-angle circular saw device of the type having:

a rotary table provided rotatably on a base;

a circular saw rotated by driving means and supported on said rotary table in such a manner as to be capable of being lifted and lowered;

a first cover for covering an upper portion of said circular saw;

a fence for bracing a rear surface of a workpiece to be cut, said fence being positioned adjacent a rear end of said base;

a linear slit in said rotary table allowing said circular saw to pass therethrough as said circular saw is lowered;

a longitudinally elongated sawdust accommodating chamber formed on a lower side of said slit;

a sawdust blow-up port communicating with said sawdust accommodating chamber and positioned at a rear end of said slit in an upper surface of said rotary table;

said fence having a curved portion which is curved to avoid interference with said circular saw and forming a rear side of said sawdust blow-up port, a wall surface of said curved portion being in the form of a conical wall surface;

wherein, when said circular saw is lowered and begins to enter said slit, the sawdust in said sawdust accommodating chamber is blown up by an air flow produced by the rotation of said circular saw, in such a manner as to pass by an inner side of a rear end of said outer cover via said sawdust blow-up port; the improvement comprising:

said sawdust accommodating chamber being closed at the bottom thereof by a second cover and having a substantially arcuate bag-like shape as viewed from a side of said device;

a sawdust-guiding frame piece suspended from a lower end of a rear portion of said first cover and extending therefrom and having a length to close a gap between the lower end of the rear portion of said first cover and an upper surface of said curved portion is a central portion of said fence substantially smoothly when said circular saw is lowered to a maximum level, thereby guiding the sawdust blowing up via said blow-up port to the inner side of the rear end of said first cover.

2. A variable cutting-angle circular saw device as defined by claim 1, wherein said first cover includes a notched portion formed from a central portion of said first cover to said rear portion of said first cover, said sawdust-guiding frame piece being suspended from a lower end portion of said notched portion.

* * * * *